United States Patent
Kendall et al.

(10) Patent No.: US 9,886,178 B2
(45) Date of Patent: *Feb. 6, 2018

(54) USER INTERFACES

(71) Applicants: Geoff Kendall, Cheshire (GB); Mark Rivers, Cheshire (GB)

(72) Inventors: Geoff Kendall, Cheshire (GB); Mark Rivers, Cheshire (GB)

(73) Assignee: Mentor Graphics Corporation, Wilsonville, OR (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/212,288

(22) Filed: Mar. 14, 2014

(65) Prior Publication Data

US 2014/0201656 A1 Jul. 17, 2014

Related U.S. Application Data

(63) Continuation of application No. 11/884,182, filed as application No. PCT/EP2006/001291 on Feb. 13, 2006, now Pat. No. 8,713,460.

(30) Foreign Application Priority Data

Feb. 12, 2005 (GB) .................................. 0502891.5

(51) Int. Cl.
*G06F 3/048* (2013.01)
*G06F 3/0484* (2013.01)
(Continued)

(52) U.S. Cl.
CPC ...... *G06F 3/04845* (2013.01); *G06F 3/04815* (2013.01); *G06F 3/04817* (2013.01); *G06F 3/04842* (2013.01); *G06T 3/00* (2013.01)

(58) Field of Classification Search
CPC ............. G06F 3/04845; G06F 3/04815; G06F 3/04817; G06F 3/04842; G06T 3/00
See application file for complete search history.

(56) References Cited

U.S. PATENT DOCUMENTS 3,621,214 A 11/1971 Romney et al.
5,446,776 A * 8/1995 Tam ..................... G01N 23/046
378/15

(Continued)

OTHER PUBLICATIONS

Examiner's Report from corresponding application EP 06706902.1, dated Apr. 8, 2013 (6 pages).

(Continued)

*Primary Examiner* — Anil N Kumar
(74) *Attorney, Agent, or Firm* — Klarquist Sparkman, LLP

(57) ABSTRACT

User interface (UI) techniques, and more particularly to graphical user interface (GUI) techniques providing 3-dimensional (3-D) renditions. A method of displaying one or more graphical objects, the method being carried out in an electronic device, the device having processing circuitry, memory and a display device, the method comprising: obtaining first image data defining at least one two-dimensional graphical component; performing a transformation operation on the first image data to generate second image data defining, for the or each graphical component, a modified form of the graphical component; using said second image data, displaying the modified form whereby the or each graphical component has the appearance of having a component of dimension perpendicular to the plane of the display device. Disclosed GUIs can be employed by users to interact with electronic devices having a display, in particular but not limited to hand-held devices with small screens.

18 Claims, 7 Drawing Sheets

(51) Int. Cl.
*G06T 3/00* (2006.01)
*G06F 3/0481* (2013.01)

(56) References Cited

U.S. PATENT DOCUMENTS

| | | | | |
|---|---|---|---|---|
| 5,825,363 | A * | 10/1998 | Anderson | G06T 15/405 |
| | | | | 345/422 |
| 5,872,570 | A * | 2/1999 | Otto | G06T 15/40 |
| | | | | 345/421 |
| 6,215,503 | B1 * | 4/2001 | Snyder | G06T 15/40 |
| | | | | 345/629 |
| 6,215,516 | B1 | 4/2001 | Ma et al. | |
| 6,466,237 | B1 * | 10/2002 | Miyao | G06F 3/0483 |
| | | | | 707/E17.029 |
| 6,577,330 | B1 * | 6/2003 | Tsuda | G06F 3/04815 |
| | | | | 715/781 |
| 6,972,757 | B2 | 12/2005 | Arikawa et al. | |
| 7,119,819 | B1 * | 10/2006 | Robertson | G06F 3/04815 |
| | | | | 715/738 |
| 7,193,629 | B2 | 3/2007 | Kake et al. | |
| 7,439,975 | B2 | 10/2008 | Hsu | |
| 2003/0058241 | A1 * | 3/2003 | Hsu | G06T 15/60 |
| | | | | 345/426 |
| 2004/0085356 | A1 * | 5/2004 | Kake | A63F 13/10 |
| | | | | 715/757 |

OTHER PUBLICATIONS

Second Examiner's Report from corresponding application EP 06706902.1, dated Sep. 2, 2013 (4 pages).
International Search Report from corresponding International Application No. PCT/EP2006/001291, dated Jun. 16, 2006 (2 pages).
Written Opinion of the International Search Authority from corresponding International Application No. PCT/EP2006/001291, dated Aug. 12, 2007 (5 pages).

* cited by examiner

USER INTERFACES

CROSS REFERENCE TO RELATED APPLICATIONS

This is a Continuation of U.S. patent application Ser. No. 11/884,182, filed Jun. 4, 2008, which claims the benefit of International Application No. PCT/EP2006/001291, filed Feb. 13, 2006, which was published in English under PCT Article 21(2), which in turn claims the benefit of Great Britain Application No. 0502891.5, filed Feb. 12, 2005. Each of the above-stated applications is incorporated herein in its entirety.

The present invention relates to user interface (UI) techniques, and more particularly to graphical user interface (GUI) techniques providing 3-dimensional (3-D) renditions.

This invention concerns GUIs employed by users to interact with electronic devices having a display, in particular but not limited to hand-held devices with small screens (see FIG. 1 (PRIOR ART)). These devices are (a) a smart phone with keyboard, (b) a PDA with cursor pad and stylus, (c) a mobile phone with joystick and keys, and (d) a TV with remote control. However, the invention is applicable to devices having screens of any size, including PCs.

In prior art systems, users interact with such devices via input mechanisms, with visual feedback provided via interactive and non-interactive graphical elements (such as controls, data, icons, text) presented and laid out on the display in a two-dimensional manner. The use of 3D effects in prior art has mainly been limited to giving an impression of depth to otherwise 2D elements through the use of shadows or shading.

1.1 Limitations of Current GUI Approaches

GUI technologies such as Microsoft MFC or Java Swing consider a device's display to be analogous to a flat surface, upon which components are laid out in two dimensions. This approach generally imposes two significant constraints on how components can be arranged:

Every component's extent (i.e. the maximum area of the screen it can occupy) is constrained to a rectangular region, generally described in terms of an X and Y coordinate, a width and a height.

While one component may be contained within another (for example, a checkbox within a panel), it must fit within the bounds of that container.

These restrictions result in strictly hierarchical and inherently 'flat' GUI layouts. FIG. 2 (PRIOR ART) illustrates how GUI components (202, 202a, 202b, 204, 206a-d) are conventionally confined to rectangular regions of the screen 200.

1.2 The Need to Move Beyond 2D

The restrictions of current 2D GUI approaches may have proved acceptable in the context of desktop computers, but they are too limited to deliver the kinds of visual and interactive experience demanded by users of the new classes of electronic device that are now becoming commonplace.

Issues such as small screen size, increasing complexity (and range) of features, and raised consumer expectations, all conspire to make it difficult to design effective user interfaces within the constraints of 2D.

The present invention provides a method of displaying one or more graphical objects, the method being carried out in an electronic device, the device having processing circuitry, memory and a display device, the method comprising: obtaining first image data, the first image data defining at least one two-dimensional graphical component; performing a transformation operation on the first image data to generate second image data, the second image data defining, for the or each graphical component, a modified form of the graphical component; using said second image data, displaying the modified form whereby the or each graphical component has the appearance of having a component of dimension perpendicular the plane of the display device. In other words, the graphical component, post-transformation, of extending at least partially in the direction perpendicular to the plane of the display.

According to another aspect of the invention there is provided a method of displaying one or more moving graphical objects, the method being carried out in an electronic device, the device including processing circuitry, memory and a display device, the method comprising: (a) obtaining first image data, the first image data defining at least one two-dimensional graphical component; (b) for each of one or more instants during a predetermined time period, (b1) performing a transformation operation on the first image data to generate second image data, the second image data defining, for the or each graphical component, a modified form of the graphical component; and (b2) using said second image data, displaying the modified form; thereby at one more of said instants generating a rendition of the or each graphical component so as to appear to having a component of dimension perpendicular the plane of the display device, whereby the two-dimensional object appears to move within a three-dimensional space.

Preferably, steps (b1) and (b2) are carried out at a plurality of instants, thereby giving the appearance of gradual natural motion. The predetermined period may be any suitable length to give satisfying appearance, for example k hundredths of a second (where 1<=k<=10), m tenths of a second (where 1<=m<=10), or n seconds (where 1<=n<=10). During the predetermined period, the transformation operation and display step may be carried out p tens of times (where 1<=p<=10), q hundreds of times (where 1<=q<=10), or r thousands of times (where 1<=r<=10), depending on design constraints, so as to give an acceptable appearance of movement.

The invention further provides an electronic device, comprising: processing circuitry, memory, one or more user input devices and a display device; wherein, in use, the processing circuitry is interoperable with said memory for executing instructions corresponding to the methods defined in any of the appended claims 1 to 11, or according to any of the particular embodiments described herein.

According to another aspect of the invention there is provided a recordable, rewritable or recorded medium having recorded or stored thereon machine readable data defining or transformable into instructions for execution by processing circuitry and corresponding to at least the steps of the methods set out in any of the appended claims 1 to 11, or according to any of the particular embodiments described herein.

Using techniques according to the invention, electronic devices with displays, and/or their UIs are modified, so that the primary way in which users interact with them involves giving the graphical elements on the display a three-dimensional appearance, and the impression of having being laid out in three-dimensional space. In so doing the invention enables devices to offer much more sophisticated user interfaces.

The invention enables the kinds of advanced visual effects normally only associated with high-end 3D games and simulations—such as lighting, depth effects and 3D model rendering—to be employed in any GUI-based application. Moreover, because the invention is grounded in the same concepts as existing 2D GUI technologies, such capabilities can be exploited with little or no programming effort over that ordinarily required.

The techniques employed by the invention to achieve a three-dimensional effect include but are not limited to the use in a GUI of 3D models, rotation, perspective, occlusion, lighting, shading, shadows, fogging, and movement.

1.3 The Invention in Comparison to 2D GUI Technologies

The key differentiator between the present invention and existing GUI technologies is the incorporation of advanced 3D concepts to enable the delivery of much more sophisticated user experiences.

The present invention fulfils all the roles required of any modern GUI technology, and it can thus be applied in any situation where a 2D GUI might otherwise be employed. In particular:

- The modes of user interaction supported by the invention are recognisable to anyone familiar with existing GUI approaches (e.g. click and drag, scroll, text entry, keyboard focus).
- The invention provides a structure for essential GUI features, including but not limited to hit testing, event handling, data binding, and grouping/aggregation.

A preferred embodiment of the invention provides a 3D GUI framework, which existing developers may use in place of 2D GUI technology to deliver far more compelling 3D GUI's.

1.4 The Invention in Comparison to 3D Graphics Software

The use of 3D graphics on electronic devices with displays has conventionally been exploited primarily in the context of realising 3D "worlds"—for example in games or flight simulators—where the aim is to give the user the impression of being immersed in a three dimensional environment, and where the modes of interactivity afforded to the user are highly constrained by the nature of the simulation (e.g. steering a car, walking from room to room, or picking up objects).

In contrast, the present invention employs 3D concepts in a much different sense, to enhance the experience afforded by any software program with a graphical user interface (as defined in section 1.5 below).

Particular differences between the present invention and 3D simulations include:

- the present invention does not enable the construction of complete 3D environments; rather it affords a way to give GUI components a three-dimensional appearance, and the impression of having been laid out in three-dimensional space.
- Users may interact with the GUI's components directly, for example via click and drag operations.
- The invention enables 3D graphics optimisations that are specific to GUI's (e.g. only redrawing areas of the display that have changed).

Thus the invention enhances the experience offered by any software application with a graphical user interface.

Embodiments of the invention will now be described in detail, by way of example, with reference to the accompanying drawings, in which.

1.5 Introduction

Figure 1:
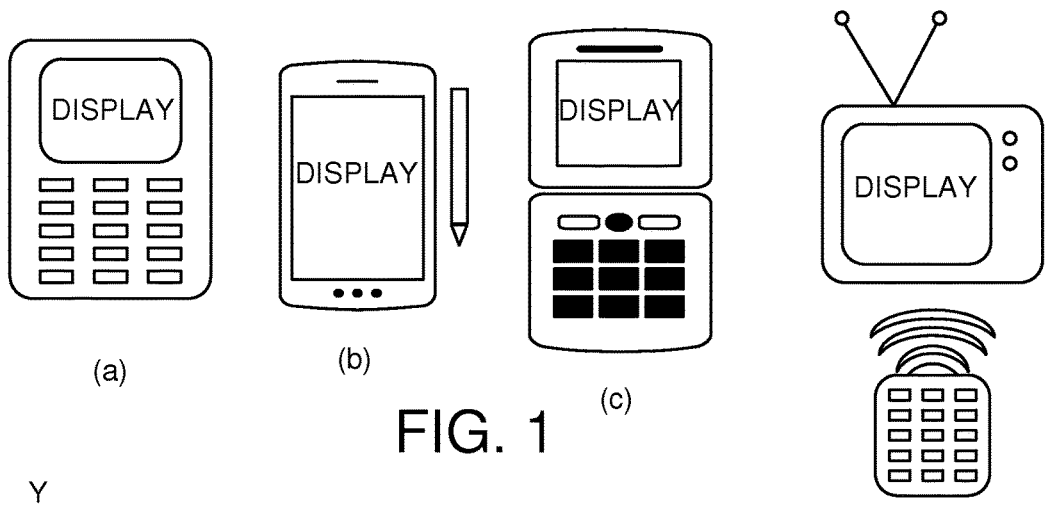
FIG. 1 (PRIOR ART) shows some examples of types of device that benefit from techniques according to the present invention.

In the current context, applications of the techniques according to the invention include software programs that possess their own Graphical User Interface (GUI)—such as menu systems, browsers, word processors, spreadsheets and agendas—as opposed to those that do not (such as command-line tools, or server software controlled over a network by 'thin' browser-based interfaces).

There exist many technologies for creating advanced GUIs (e.g. Microsoft MFC and Java Swing). The following concepts are fundamental to all such methods:

- A GUI's display is composed of a number of interactive and non-interactive graphical elements (e.g. controls, data, icons, text), which are referred to herein as GUI components;
- Functionally related components may be grouped into compound components; and
- The visual and interactive characteristics of a component may change in response to events, which may be caused by user interaction (e.g. a stylus tap or key press), changes in application state (e.g. a processing operation finishes), or modification of a piece of data being displayed.

The present invention enables the delivery of much more sophisticated GUIs than current approaches allow, but it is grounded in these same three concepts. Thus a new GUI framework implemented as an embodiment of the invention should prove to be readily usable by any current GUI developer.

The present invention modifies devices so that the primary way in which users interact with them involves giving the graphical elements on the display a three-dimensional appearance, and the impression of having being laid out in three-dimensional space.

The invention is completely independent of any specific hardware, operating system, or graphical rendering capabilities. It incorporates processes designed to maximise performance so that even devices with relatively low processing power can benefit from it. Thus it is possible to conceive of an embodiment of the invention for any electronic device with a graphical display that would in the absence of the invention be capable of displaying a 2D GUI. It will be appreciated that the technology is independent of the type of display (LCD, plasma, CRT, projector, etc.) Persons skilled in the art will appreciate that the platform upon which techniques according to the invention may be based include IBM PC/Windows, Apple Mac/Mac OS, PDA/WindowsCE/PalmOS/SymbianOS, or (smart) mobile phone/SymbianOS, among many others. PC architecture is well known in the art, and details of the hardware are omitted here, for brevity. Details of hardware/OS considerations in the case of a Symbian OS based mobile phone implementation are available in the white paper Creating Symbian OS phones, by Peter Sanders, April 2002 (http://www.symbian.com/technology/create-symb-OS-phones.html, a copy of which was filed with the present application). In the latter case, techniques according to the present invention may be integrated, for example, with the hardware and system software as set out in that white paper, using techniques known to persons skilled in the art.

Wherever advanced capabilities are available on a particular device, it is envisaged that an embodiment of the invention for that device could take advantage of them. Furthermore, the invention is inherently suited to exploiting the advanced 3D graphics capabilities of new consumer devices as they become available.

For example, an embodiment of the invention designed for a smart phone that is optimised for OpenGL ES rendering (this being an open standard for mobile 3D graphics) may put texture-mapped 3D models and anti-aliased fonts at the GUI developer's disposal. In contrast, an embodiment designed for a less powerful device may provide support only for bitmapped text and graphics.

1.6 GUI Components Supported by the Invention

The present invention enables GUI's to incorporate a wider range of graphic types than most 2D GUI technologies. Supported types of component include:
a) 2D graphical elements, which may be rendered at any orientation to the plane of the device display, and which may include (but are not limited to): text, bitmaps, vector graphics and video clips; and
b) 3D models (such as those generated by 3D Studio).

A GUI component may be built up by combining any number of elements of type (a) and (b). For example, a checkbox component may comprise a 3D model that animates between two states (checked and unchecked), together with a text-based caption.

The invention is designed such that, in a specific embodiment, it may be chosen to implement one, some or all of the above graphic types. This ensures that the invention can be realised on any hardware platform, tuned so as to deliver GUI's with performance commensurate with the capabilities of that platform.

1.7 Laying Out a GUI in Three Dimensions

Fundamental to the present invention is that a device's display is now not considered to be a flat surface on which graphical elements are arranged in 2D, but rather as a viewport on to a 3D coordinate space.

Figure 3:
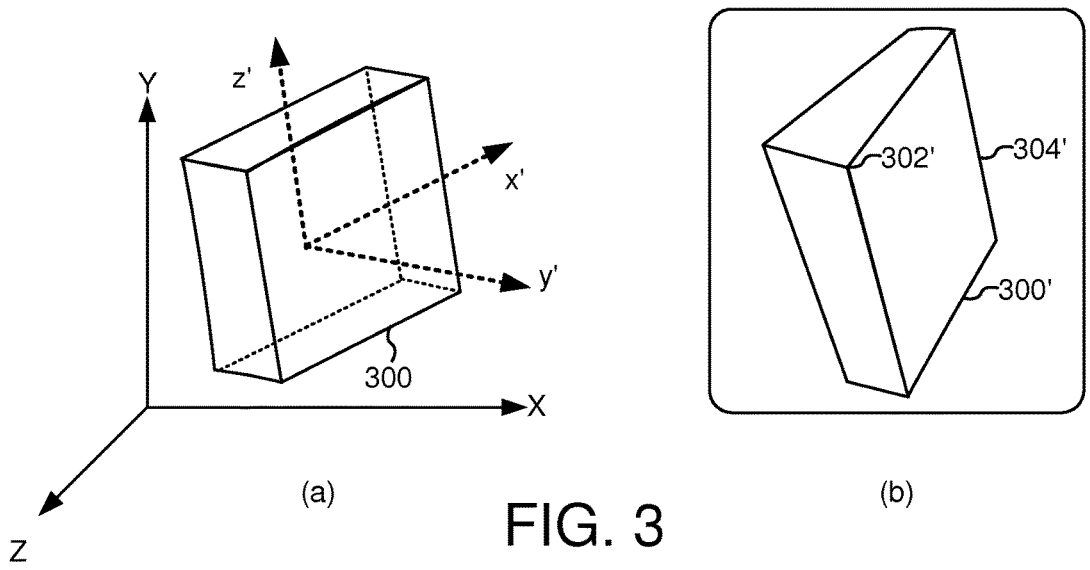
FIG. 3 shows (a) how GUI components may occupy an arbitrary position, orientation and volume in a 3D coordinate space, and (b) the display effectively acting as a viewport onto this space.

FIG. 3 shows (a) how GUI components (300) may occupy an arbitrary position, orientation and volume in a 3D coordinate space, and (b) the display effectively acting as a viewport onto this space. The present invention enables any GUI component to be positioned within a 3D coordinate space, at any location, orientation, and scale. In addition, components may be displayed with a varying degree of opacity, ranging from completely transparent to completely opaque. As seen in FIG. 3(*b*), although component 300' is displayed on a 2D screen, it is rendered in manner whereby corner 302' appears closest and the edge 304' appears distant, so the component 300 appears to extend within a 3D space.

These four properties of a component—location, orientation, scale and opacity—are collectively referred to here as its placement. A component's placement affects its ultimate on-screen appearance, but it does not change the intrinsic visual characteristics of that component (e.g. the fonts, icons and colours used to portray it).

Each component's 2D appearance on screen is ultimately affected by:
its own placement;
additional parameters including (but not limited to) those relating to perspective, depth-based effects (such as fogging), and lighting;
the placement of all other components, any of which may wholly or partially occlude the component or throw it into shadow.

The current invention includes processes for translating between 3D component placements and the 2D display and vice versa. These processes are key to the invention, since they enable both the rendering of the 3D GUI and the appropriate routing of UI events due to pointer-based user interaction (e.g. via a mouse or stylus). They also enable a user of an embodiment of the invention to exploit the flexibility of working with a GUI in three dimensions, without having to understand or handle the complexities associated with 3D rendering, occlusion, and so forth.

1.8 How the Invention Fulfils the Roles of a GUI Technology

Section 1.5 introduced three attributes common to 2D GUI technologies. The present invention has been designed to meet the same criteria, to ensure that its benefits could be brought to bear in any software program and on any device where a 2D GUI technology might otherwise have been used. This section describes embodiments of the present invention in the context of these common GUI technology attributes.

1.8.1 The Invention's Support for GUI Components

Embodiments of the present invention incorporate a component architecture that will be familiar to anyone in the GUI field due to its similarity to that provided by 2D GUI technologies such as Microsoft MFC and Java Swing. Specifically, embodiments of the present invention provide the means to construct user interfaces through the creation, customisation, aggregation and layout of components (other terms that are used in the literature to refer to same include "widgets" and "gadgets").

GUI technologies generally realise components as software objects that share at least the following five attributes:

Properties related to appearance
  These enable a developer to affect the component's graphical look and feel (e.g. background colour, fonts, icons).
Properties related to data binding
  These relate to the underlying data that the component represents (e.g. the string being edited in a text entry field; or the 'ticked/unticked' state of a checkbox).
Properties related to layout
  These enable a developer to specify where the component should appear on screen in relation to other components (i.e. to "lay out" the GUI).
Properties related to grouping
  These provide a way to group functionally related components together, so that they may be manipulated and interacted with as coherent wholes.
Event handlers
  Event handlers provide a way for developers to attach pieces of software code to the component, which are automatically executed in response to a particular event (e.g. a stylus tap or a mouse click on the component).

According to embodiments of the present invention, a component architecture is implemented using techniques that will be familiar to anyone in the GUI field, so it is discussed hereinafter only insofar as it has been fundamentally altered to achieve the advantageous effects of the invention.

Figure 2:
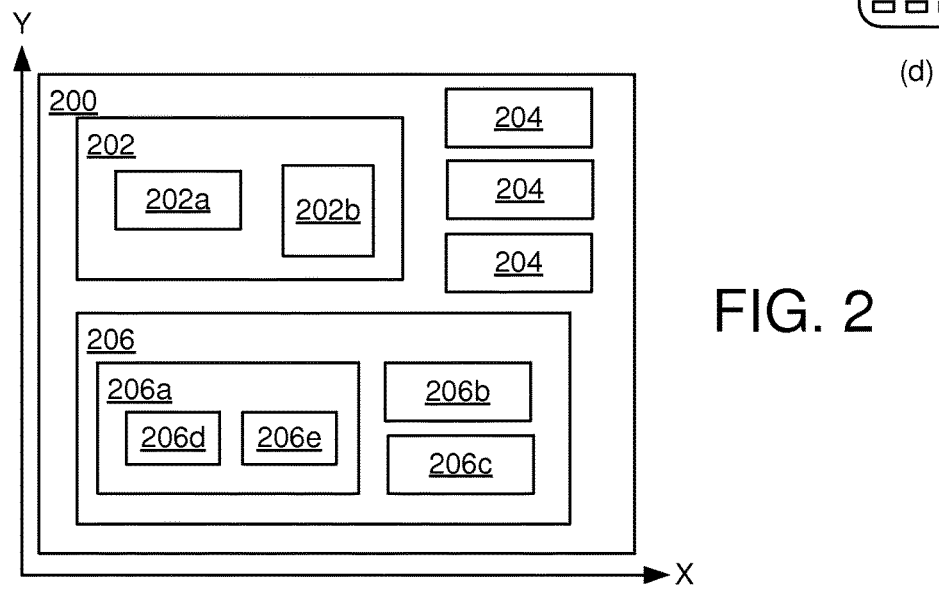
FIG. 2 (PRIOR ART) illustrates how GUI components are conventionally confined to rectangular regions of the screen.

As described in section 1.1 and illustrated in FIG. 2, existing GUI technologies enable components to be laid out within two dimensions only, normally via properties that correspond to an X coordinate, a Y coordinate, a width and a height. According to embodiments of the present invention, the concept of component layout is extended to three dimensions by replacing these 2D layout properties with the following:

X, Y, Z coordinates
  These properties describe the position in 3D space at which the centre of the component is located. The third (Z) value effectively allows the component to be positioned at any arbitrary depth 'behind' the display.
X, Y, Z axes of rotation
  These properties describe how the component is oriented in space around its centre point (see FIG. 3), thus enabling a component to be tilted at any angle to the display.
X, Y, Z scale
  These properties replace the two dimensional width and height properties, enabling the component to be scaled about its centre point by different amounts along each of its 3 axes.

Figure 4:
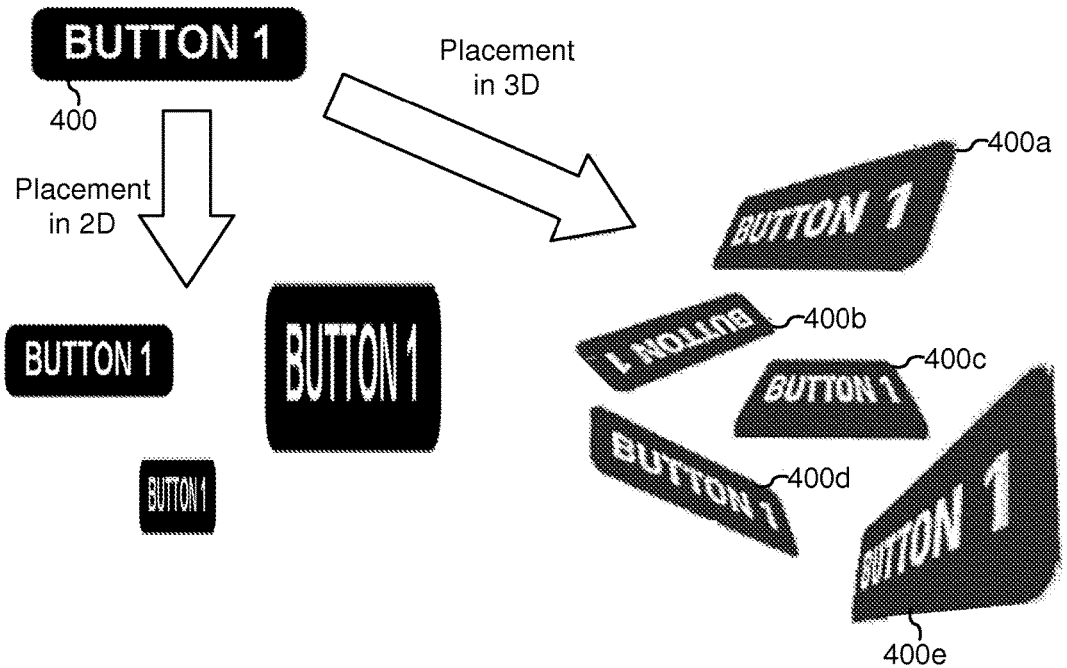
FIG. 4 shows how the invention enables even an inherently flat GUI component to appear as if it has been laid out in three dimensions.

The potential for laying out GUI components with these new properties is far greater than permitted by standard 2D layout properties: by using them in combination, a component may be positioned and oriented anywhere in 3D space, and this can result in radically different on screen appearances even for components that are essentially flat in nature. FIG. 4 shows how the invention enables even an inherently flat GUI component to appear as if it has been laid out in three dimensions; Here, based on a fundamental 2D graphical component ("Button 1"; for the sake of illustration) 400, it can bee seen that placement in 3D affords a variety of orientations (and apparent movement in a 3D space)—as shown by the rendered components (400*a-e*), compared with placement in 2D.

1.8.2 Enabling Grouping of Components

Figure 5:
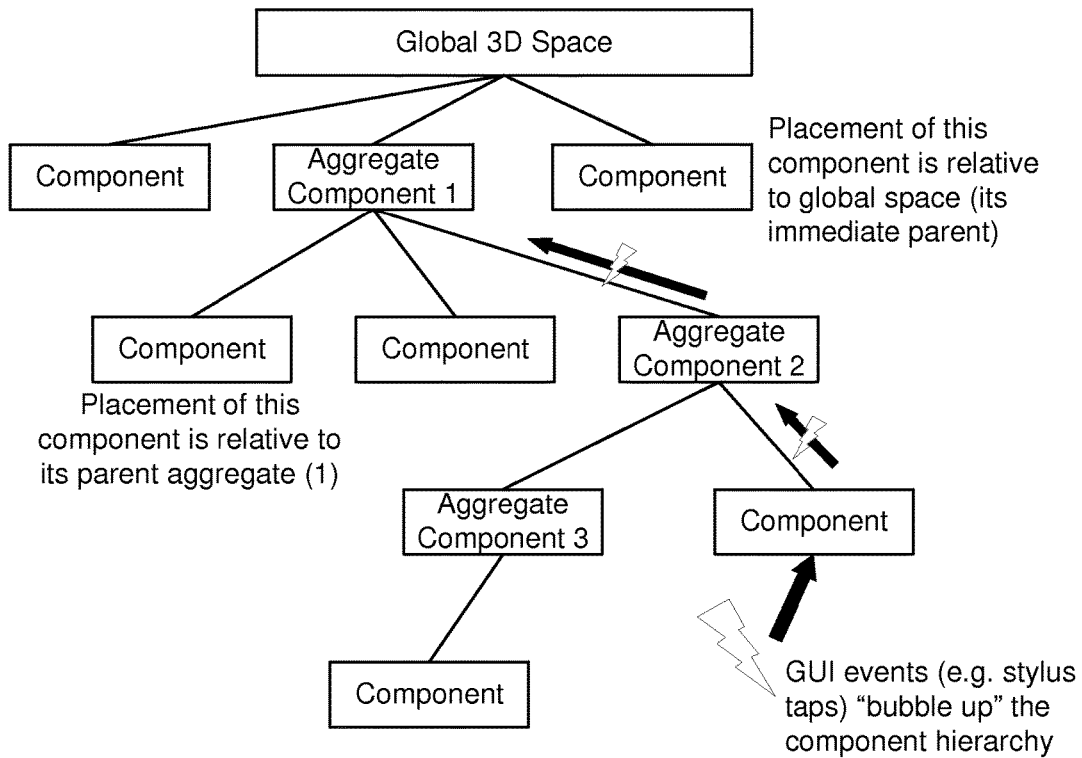
FIG. 5 shows how the invention enforces a strict GUI component hierarchy, which is used to determine how components are placed in 3D space, and to aid in the routing of UI events.

According to embodiments of the present invention, means are provided for any arbitrary collection of components to be grouped together to form an aggregate. Aggregates are just another form of component, so nesting to any depth is possible. In fact, in preferred embodiments, the invention enforces a strict hierarchy on all components in a user interface, by imposing the constraint that every component must be "parented" by exactly one aggregate, or parented directly on the global space itself (see FIG. 5). This hierarchy is used in the context of routing user interaction events correctly (see section 1.8.3).

The aggregate model preferably employed by the current invention is similar to the grouping models employed by 2D GUI technologies, but two points are worth noting. Firstly, any components may be grouped to form an aggregate, irrespective of how and where they are placed in 3D space. This is far more flexible than most 2D GUI technologies, which enforce rigid notions of containment that require grouped items to occupy the same rectangular region of the display (see section 1.1).

The second point is that a component's placement is considered to be relative to that of its immediate parent. Although such behaviour is common among 2D GUI approaches, its implications are more profound here, because of the extra degrees of freedom afforded by the current invention's use of three dimensions: by changing an aggregate's placement (location, orientation, scale, and opacity)—particularly over a period of time—complex effects such as spinning, zooming and pivoting can be achieved (see FIG. 9 for an example).

1.8.3 Detection of User Interaction Events, and Routing them to the Parts of the Software Responsible for Handling them According to embodiments of the present invention, there is implemented the range and kind of event handlers expected by a 2D GUI technology. There are two primary types of user interaction event—events resulting from stylus taps or mouse clicks, where the event contains information about a particular pixel on the display at which the event occurred, and other events such as hardware key presses, which do not occur at a specific pixel on the display. In both cases two steps are required to process the event: firstly, identify the GUI component to which the event pertains, if any, and secondly, notify the application software of the event so that it may be processed.

Suitably, once it has been determined which if any GUI component each event pertains to, the hierarchical structure of the user interface (see section 1.8.2) is used to route the event to that part of the software that should handle it. This is known as "event bubbling" and is a widely used approach within GUI frameworks (see FIG. 5). The identified GUI component is given the option to process the event, and if it chooses not to process the event, the event is passed on to its parent aggregate which is given the option of handling it, and if it does not, the event is passed on to its parent, and so on, until the root of the hierarchy is reached. According to embodiments of the present invention, the initial UI element in this process is identified in a novel way. There are two cases, one for each of the two types of event as described above.

Firstly, consider events that occur at a particular pixel on the display. Preferably, it is required that the hardware system and its system software will identify the exact pixel and pass the information as input to the subsequent process. It is necessary to determine which GUI component is associated with the specified pixel—that is, which GUI component if any contributed the most to determining the actual colour of that pixel, when the display was last updated. The process required to do this is called "hit-testing", and in the preferred embodiments of the invention this process is different compared to the simple case of a 2D GUI framework. In the 2D case, GUI components are usually rectangular, opaque, a fixed size, and usually do not overlap, so it is a relatively simple task to determine to which component the pixel belongs. In the case of the 3D UI supported by the invention, the process is not so straightforward.

Figure 6:
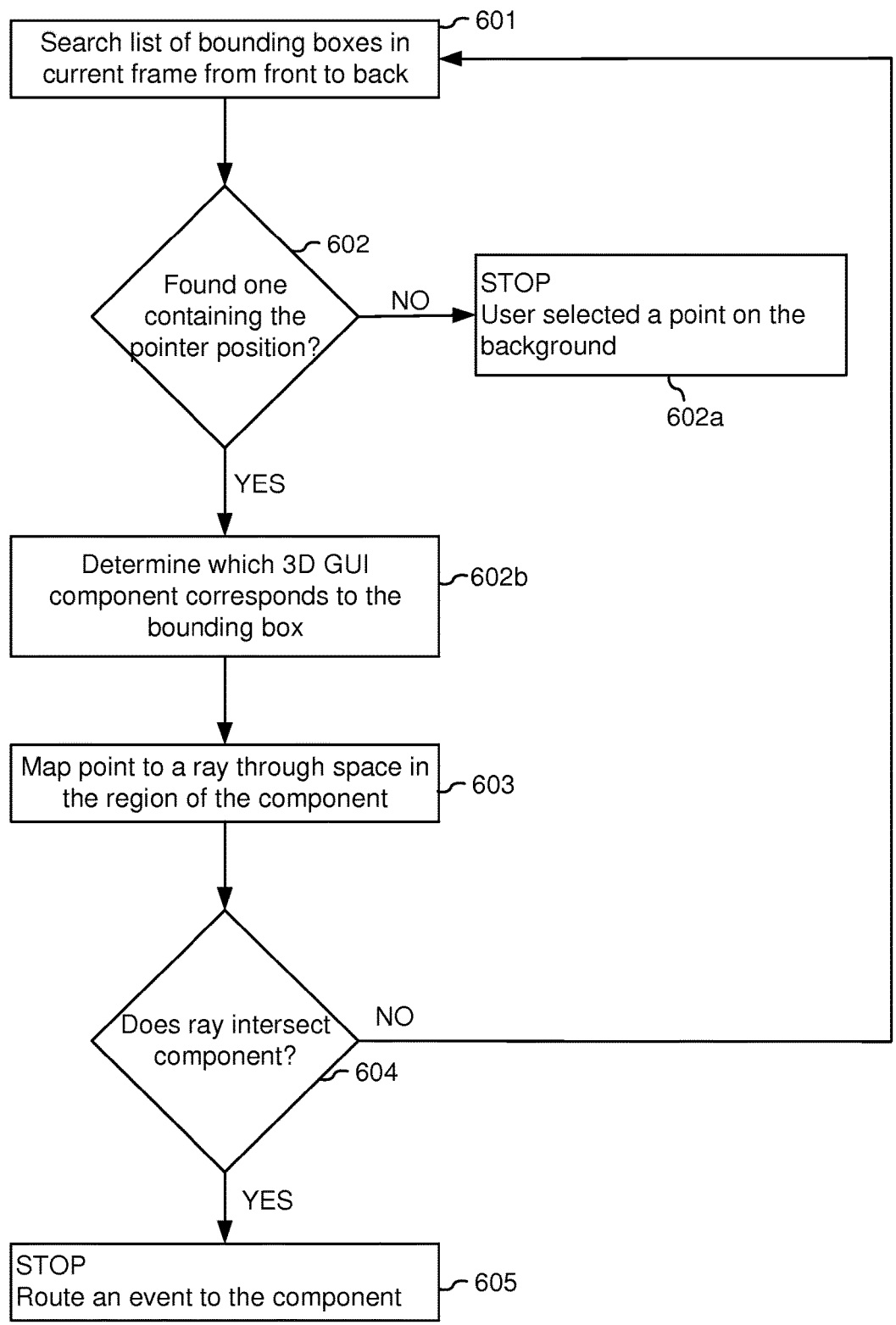
FIG. 6 shows a hit testing process according to an embodiment of the invention.

Referring to FIGS. 3 and 6, once rendered to the 2D display, the sizes of components may vary according to their "depth" in the scene and hence the perspective applied to them, their re-orientation in 3D may affect their "shape" once rendered to 2D, and of course some components may obscure others by virtue of appearing to be in front of them. In addition, the use of alpha blending to make certain pixels appear partly transparent, especially around the edges of objects to achieve "anti-aliasing", makes hit-testing more difficult.

A single point (pixel) on the 2D display, will correspond to a straight line, or ray, through the 3D space. The process of testing which GUI component has been "hit", involves determining which of those components intersected by this ray is closest to the viewer. Testing for such intersections can be a relatively computationally expensive task, especially on limited resource devices, because it involves testing for intersection with each polygon in each component, and because the ray needs to be translated into the local coordinate space of each component since their polygons are configured in local coordinates. However, two key facts about the structure of the user interface enable this process to be optimised beyond what is possible in a generalised 3D application (such as a 3D game).

FIG. 6 shows a block diagram that illustrates the optimised hit testing process according to a preferred embodiment of the present invention.

Figure 7A:
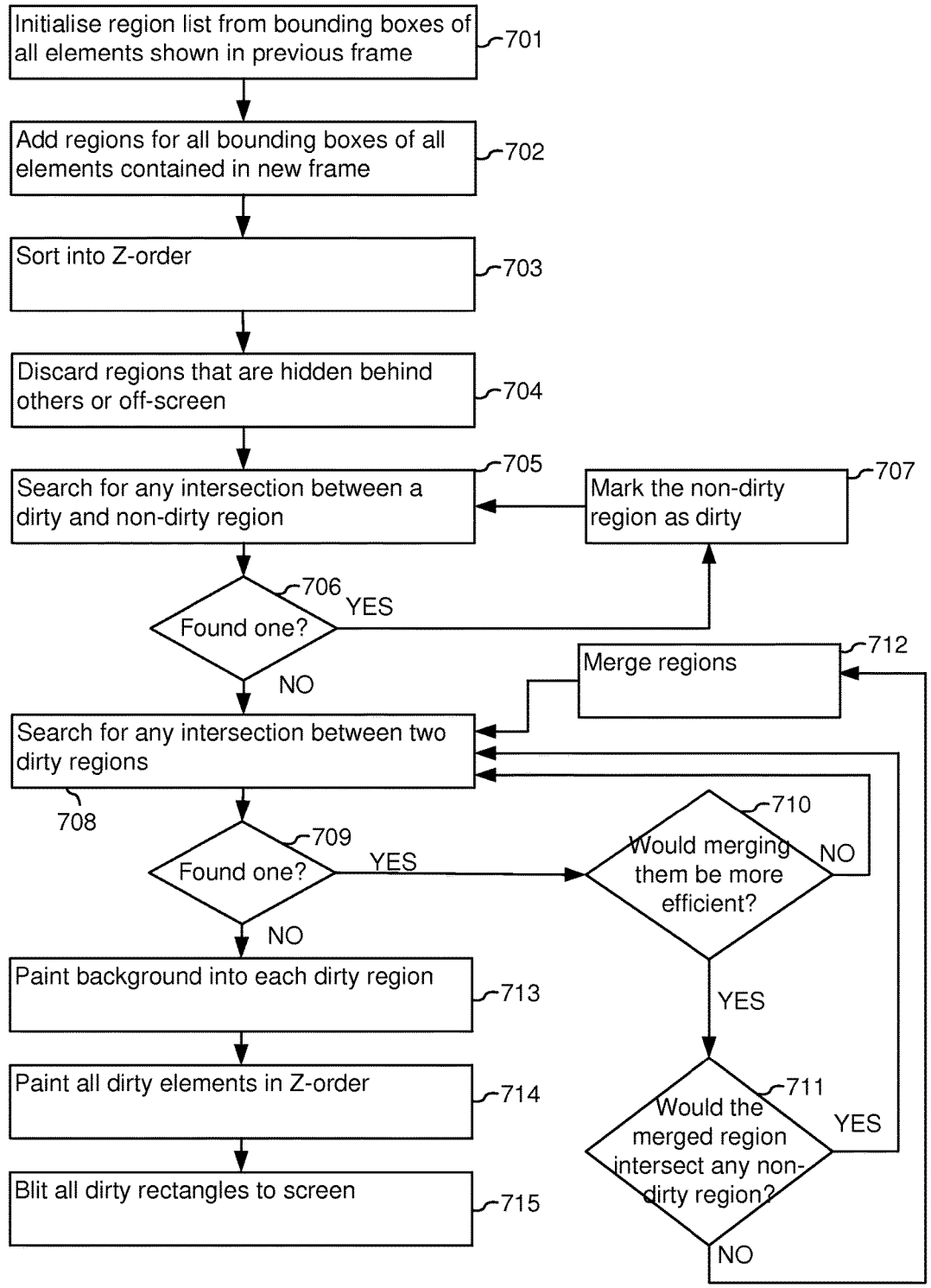
FIG. 7 illustrates (a) the rendering process according to an embodiment of the invention, (b) two successive (displayed) frames in which the placement of several components is changed, and (c) how the rendering process determines the most efficient way to repaint only those areas of the display that have changed.
Figure 7B:
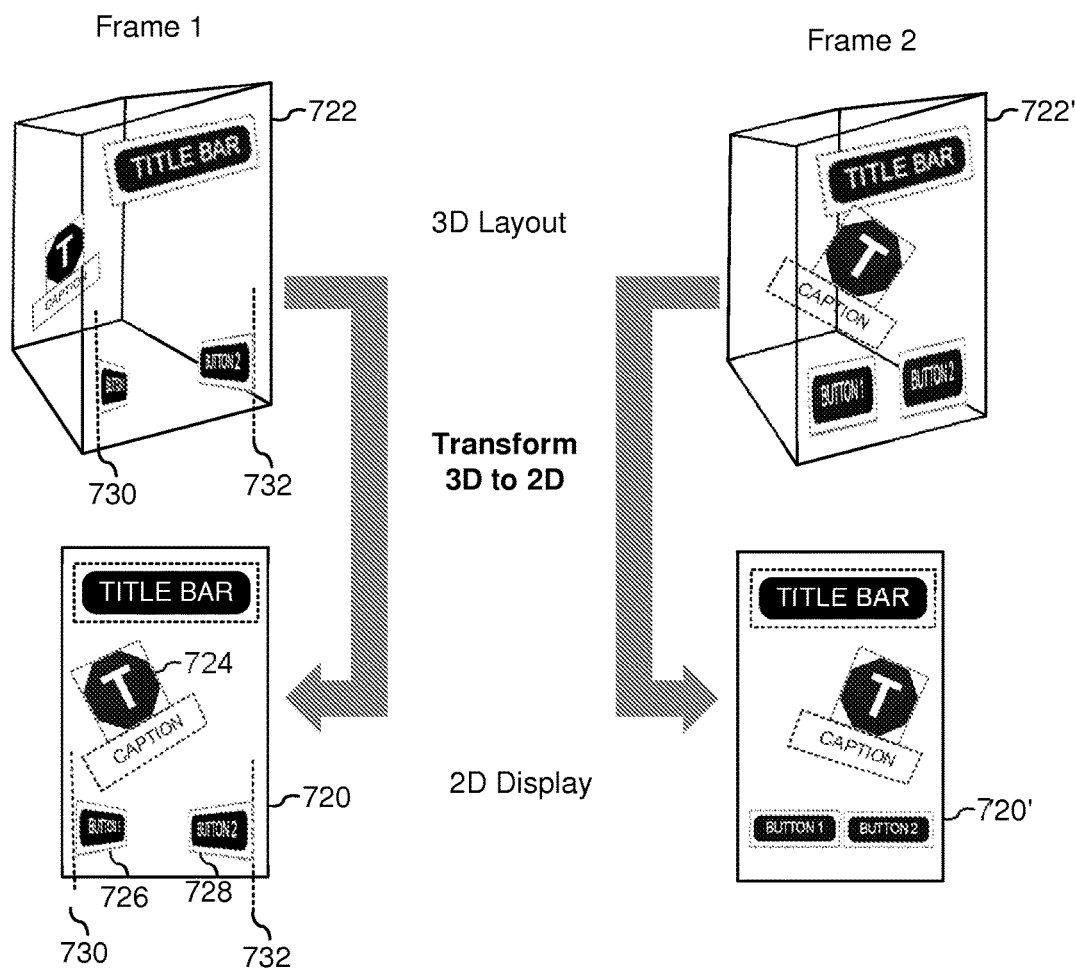
Figure 7C:
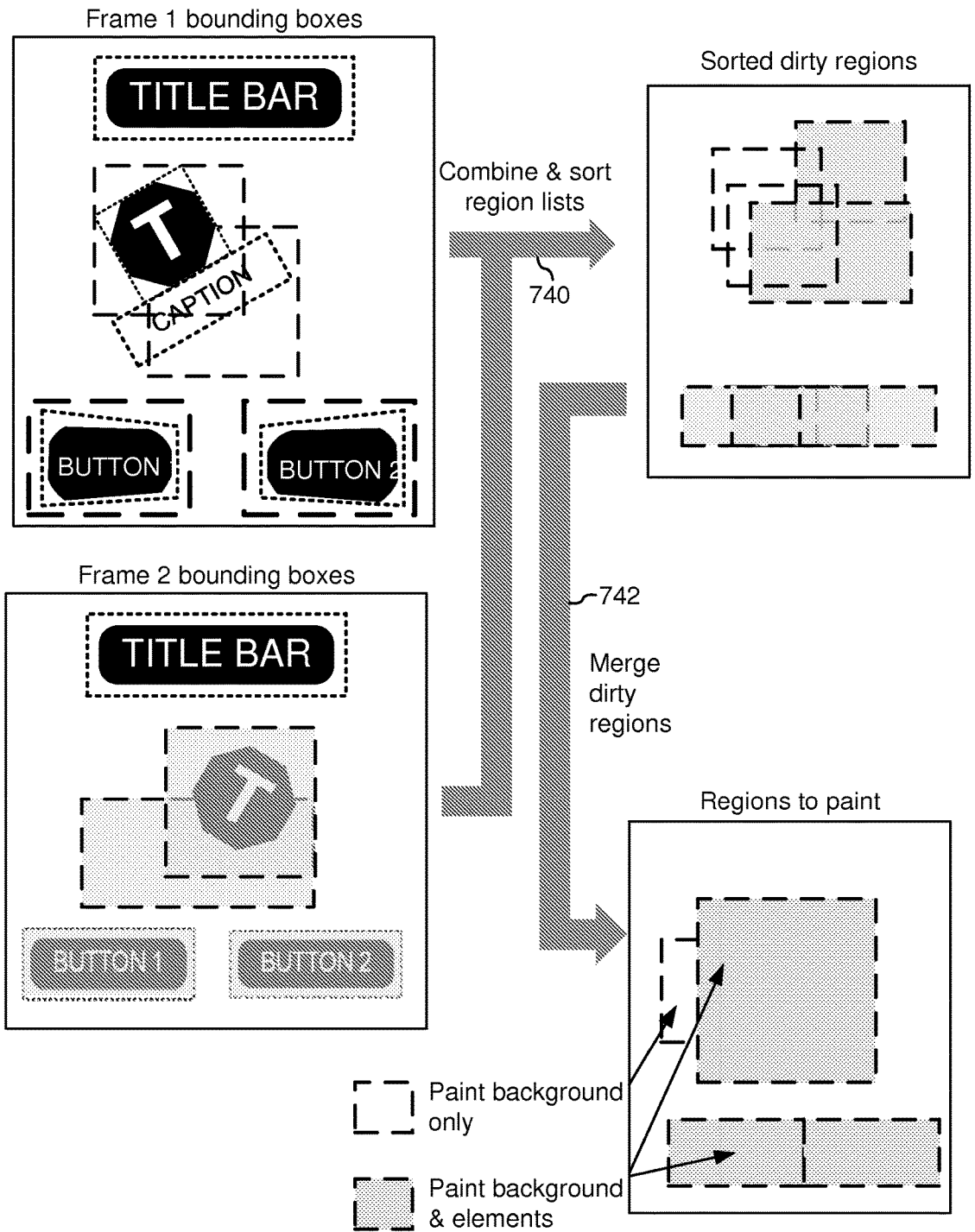

Firstly, as part of the process for rendering the 3D GUI to the 2D display (section 1.10), a set of bounding boxes in 2D pixel coordinates is derived which correspond to each UI element (see FIG. 7(c) for an example). This means that for the current state of the display, no part of a 3D GUI component can appear outside its 2D bounding box. This bounding box therefore provides an extremely fast way of testing, in pixel coordinates, whether a ray intersection for that component is actually impossible.

Secondly, as part of the rendering process, the GUI components are sorted into depth order. The resulting information can also be used to determine the order in which hit tests are made on individual components, from front to back. The first component for which the hit test succeeds, must therefore be obscuring any other components which also lie under the given pixel, and therefore that component is the one to which the UI event should be routed.

Optimisation is fully automated, as the process and the derived information needed to perform it are independent of the application. However, allowance is made for individual components to perform their own ray intersection tests if required. This allows components some flexibility to define what constitutes a "hit"—for example, a partially transparent object may or may not ignore "hits" so that they are passed through to components that lie behind.

First (step 601) a search is made of the list of bounding boxes in the current frame from front to back, to determine (step 602) whether one of the bounding boxes contains the current pointer (e.g. mouse cursor) position. If none of the bounding boxes does, this part of the process discontinues (as the user has selected a point in the background, or a "don't care" location; step 602a).

Of course, if the point lies within a given bounding box, it may still not be a "hit" on the component because the components are not rectangular and thus do not completely fill their bounding boxes. The benefit of this process is that once again it exploits the component-based nature of the GUI to improve efficiency: by using the list of regions built when rendering the current frame, step 602 efficiently filters out many hit tests that could never succeed, therefore drastically reducing the number of expensive full ray intersection tests that need to be done (see below). The net result is improved responsiveness in the user interface.

If a bounding box is found (step 602 containing the pointer position, it is then determined (step 602b) which 3D GUI component corresponds to that bounding box. Then (step 603), the point is mapped though space in the region of the component found. A test is made (604) to determine whether the ray intersects with the component. For some components such as planar images or text, detecting an intersection may be easy, whereas for others it may be more expensive. If it is found at 604 that a ray does not intersect a component, processing returns to step 601. If it is found at 604 that it does intersect, relevant event is routed to the component and this part of the processing discontinues.

The second type of UI event includes those (such as a hardware key presses) that do not occur at a particular pixel. The invention also needs to deal with these in a novel way. When there is no hit pixel to provide a means of identifying the target component, there must be the notion of a "currently active" component that will receive any such events. This concept is familiar from many 2D GUI frameworks, and is usually called focus. In a typical 2D GUI framework, because the layout of the GUI is flat and follows regular conventions of layout (such as containment), focus is usually managed in a way fixed by the framework. For example, in Microsoft Windows, the control with focus is indicated to the user by a dotted rectangle, and this focus can be moved around the GUI by means of keys with consistent functions, for example, the "tab" key always moves the focus to the control considered to be next in the "tab order".

In a 3D user interface where there is no such regular layout and more degrees of freedom, it is not practical to dictate how focus is visually indicated, or how it is transferred between components. The invention therefore preferably provides a modified way of dealing with focus, which allows individual components to choose how to modify their appearance when focused, if they are able to accept focus. Changes of focus between components are handled by the aggregate parent of the currently focused component. When a UI event occurs that a component does not wish to handle directly, that event bubbles to the parent, and the parent can decide whether that event should trigger the transfer of focus to a different component. This approach provides maximum flexibility in terms of representing and controlling focus, while still allowing the core framework to determine where to route an event such as a key press.

1.9 Exploiting the Use of 3D Concepts

The key feature of this invention is that it uses techniques from general 3D graphics, to produce user interfaces with a 3D appearance, in such a way that they can function effectively and efficiently as user interfaces even on devices with limited memory and processing power and small displays. This is suitably achieved by constraining the configuration of the interface to be a set of discrete self-contained 3D objects (components) positioned and oriented in a space, thereby allowing a number of simplifications and optimisations which make both the implementation practical, and the resulting interfaces easier to design and use. Enclosing or surrounding forms such as walls, rooms, sky etc, as seen in game or simulation software, are disallowed. Without surroundings, these 3D objects are floating in space, and therefore the invention allows an optional immoveable "background" to be rendered behind all components. (Note that in the context of the current invention the terms "3D object" and "GUI component" are effectively equivalent, but in this section we specifically use the "object" terminology simply because it is more familiar in the domain of 3D graphics.)

Without surroundings or enclosed environments, there are two key aspects of a GUI constructed using embodiments of the present invention that give it its three-dimensional appearance. Firstly, an individual object itself may look three dimensional, either by way of a static appearance, or due to movement. Secondly, the spatial layout and movement of objects may give them a 3D appearance. These will each be addressed in turn.

1.9.1 Enabling GUI Components to have a Three Dimensional Appearance

In many modern 2D GUI systems with adequate display hardware, some impression of 3D can be achieved for individual graphical elements by producing 2D images of 3D objects, using techniques such as shadows and shading to give a 3D appearance. However, to show the element from a different angle requires a new image. To achieve anything more than minimal dynamic 3D effects is impractical. Because our invention preferably allows graphical elements to be structured in three dimensions and then manipulated in three dimensions, more sophisticated 3D effects are possible.

Regarding structuring elements in 3D, an element can be defined using a 3D "mesh" of polygons, as commonly used in 3D graphics applications (and as constructed by software such as 3D Studio). This means that the object has "true" depth, and not just depth implied by creative use of shading on a 2D image. The invention allows a 3D mesh element to be oriented at, and thus viewed from, any angle. When combined with dynamic manipulation, such as rotating the object, this gives a much stronger impression of 3D than the 2D improvisation. Also, because the invention preferably uses a 3D coordinate system for positioning and orienting elements, even elements that are defined in two dimensions can take on 3D appearance, and be subject to dynamic orientation in 3D, such as rotation. One example would be an image or video clip, which by its nature is two-dimensional, but in our invention can be oriented at an angle to the plane of the display, so that it appears to the viewer that they are looking at the image or clip from an angle (see FIG. 4, discussed below).

1.9.2 Enabling GUI Components to be Laid Out in Three Dimensions

The spatial layout of objects is important in giving the interface a 3D appearance. The present invention preferably allows objects to be positioned and oriented in a 3D space, which is then rendered to the 2D display in such a way that it appears three-dimensional.

There are two key aspects of the rendering process that contribute to this 3D impression: projection, and depth cueing. Projection is the most important—it is the process by which points in the 3D space are mapped to points on the 2D display, and is responsible for the impression of perspective. According to preferred embodiments of the present invention, projection is used in a way that renders the 3D content to 2D as if it is viewed from a "camera point", with one important modification specific to GUI construction.

Sometimes when constructing a 3D user interface that does not contain surroundings or enclosures like rooms, a consistent impression of 3D across the display is not necessary and in fact can make interface design awkward. Therefore, the camera position can be effectively changed for certain parts of the scene. This feature is referred to as local perspective.

An example is an aggregate of components forming a message box. This message box may be animated across the screen, and as it moves, it may look odd to view it from a changing angle. This is a consequence of the way visual perception works in that in lieu of peripheral information such as surroundings or walls, the eye focuses on just that block of information of interest. Local perspective allows the message box to be moved sideways across the 3D interface layout whilst appearing to always be viewed from directly in front. The rest of the interface on screen is unaffected.

The second aspect of rendering that contributes to the 3D impression is depth cueing, which means using visual techniques to emphasise the distance of objects, such as making them darker or more "fogged" the further away they are. Again, the present invention preferably uses familiar methods of depth cueing, but can do so in ways that would not work in a 3D scene that was not constructed according to the specific composition constraints imposed within the current invention.

As with the appearance of individual elements, dynamic movement of elements emphasises the 3D nature of the interface. As an item moves towards or away from the viewer and its apparent size and tint changes due to perspective and depth cueing, the impression of 3D is greatly enhanced. For this reason, the present invention preferably provides a sophisticated framework for easily, or even automatically, animating GUI components, both in response to user events, and as "drift", where certain components may be made to spin around very slowly even when the user is "idle", to maintain the impression of three dimensionality.

By promoting the effective design of 3D GUI's through the exploitation of configurable features such as depth cueing, local perspective and animation, the present invention preferably more completely delivers on its promise to not just enable 3D GUI's to be constructed, but to enable the 3D capability to be fully taken advantage of, resulting in more impressive and engaging user experiences.

1.10 Rendering 3D Components to the 2D Display

FIG. 7 illustrates (a) the rendering process according to an embodiment of the invention, (b) two successive (screen)

frames in which the placement of several components is changed, and (c) how the rendering process determines the most efficient way to repaint only those areas of the display that have changed. FIG. 7(a) shows a block diagram illustrating the invention's process for rendering ("painting") the 3D GUI to the display. This process is not typical of usual 3D scene rendering (see section 1.4), because it exploits the unique properties of the 3D GUI (most notably the fact that it consists of 3D components laid out against a 2D background) to ensure that the device's display is updated as efficiently as possible.

A device's display is updated as a series of frames. The process shown in FIG. 7 is designed to only update the areas of the display that change between each frame.

Whenever the placement or visibility of a GUI component is changed, it is preferably marked as dirty to indicate that its constituent graphic elements need to be repainted when the next frame is displayed. By incrementally altering the placement of a component within 3D space over a series of frames, it is possible to achieve complex animation effects. FIG. 7(b) shows how an example 3D GUI layout might be shown on two successive frames, and indicates how these frames would appear on the 2D display. FIG. 7(c) illustrates how the process described in FIG. 7(a) would be apply in this case to determine the areas of the screen that would need to be repainted.

The process illustrated in FIG. 7(a) may be described as follows.

At step 701a region list from bounding boxes of all elements shown in the preceding frame is initialised. A bounding box is the minimum rectangle on the display that will fully enclose a graphic element when it is drawn. Preferably a list is maintained of all graphical elements that make up the GUI components being displayed. The bounding box for each of these is calculated by projecting 3D coordinates into 2D coordinates. The process works preferably by analysing bounding boxes because rectangles are faster to work with than irregular shapes.

Next, at step 702, regions for all bounding boxes of all elements contained in the new frame are added (note that each GUI component contributes information to enable its bounding box to be calculated—see section 1.10.1 for details). At step 702 (i.e. current frame) regions are dirty only if their graphic elements have moved or changed (e.g. "Button 1" in FIGS. 7(b) and 7(c)). Then, at step 703, the bounding boxes are sorted into z-order (distance into the screen), starting with the nearest first. Regions that are hidden behind others or are off-screen can then be discarded (step 704).

At step 705, a search is made for any intersection between a dirty and non-dirty region. A dirty region is one that needs repainting. At step 701 (i.e. previous frame), regions are dirty unless their graphic elements remain unchanged in the current frame (e.g. "Title Bar" in FIGS. 7(b) and 7(c)). If such an intersection is found (step 706), the non-dirty regions are then marked as dirty (step 707).

If no intersection was found at step 706, a search is made (steps 708, 709) for any intersection between two dirty regions. If an intersection between two dirty regions is found in step 709, a test is made (step 710) to determine whether merging them would be more efficient. The decision on whether merging the regions would be more efficient is based on area: if the resulting merged region has an area less than the sum of the areas of the two regions multiplied by a threshold factor, typically 1.4, it will be more efficient to update these regions as one. If the determination at step 710 is negative, processing returns to step 708. If the determination was positive, it is then determined (step 711) whether a merged region would intersect with any dirty region. If merging the regions causes other regions to become dirty, it would negate the efficiency advantage of merging them. If the determination at step 711 is positive, then processing returns to step 708. If not, processing moves to step 712, where the regions are merged. Merging the regions means replacing two regions with one that is their geometrical union.

Referring back to step 709, if no intersection between dirty regions is found, the next step (713) is to paint the 2D backdrop into all dirty regions, effectively erasing those areas in preparation for the 3D components to be rendered onto them.

Thereafter (step 714) all dirty elements are painted in Z-order to a memory buffer (see section 1.10.1 for more detail), and the final process (step 715) is performed to transfer the contents of the memory buffer to the screen to complete the new frame.

Because this process exploits the constrained nature of the 3D scene when used as a GUI to reduce to the number of GUI components rendered in each frame, the total cost of the paint and display update operations required in steps 713 and 715 is reduced. Such optimisation ensures that the process works as efficiently as possible, maximising the range of devices on which it can be useful embodied.

FIG. 7 (b) illustrates two successive (displayed) frames in which the placement of several components is changed. The lower rectangles (720, 720') show what is displayed to the user, while the upper shapes 722, 722' depict the movement in a 3D that appears to the user to be happening. That is, for example, the component "Icon Caption" 724 has the appearance of flying in from the distance with a variable orientation, while the components "Button 1" 726 and "Button 2" 728 appear, between frames 1 and 2, to rotate, about vertical axes 730 and 732, respectively, near the edges of the screen, into the plane of the display.

FIG. 7(c) illustrates how the rendering process determines the most efficient way to repaint only those areas of the display that have changed. In particular, the effects of the procedures, for successive frames 1 and 2, of (740) combining and sorting region lists and (742) merging dirty regions are illustrated, for the same components as in FIG. 7(b).

1.10.1 The Involvement of GUI Components in the Rendering Process

As part of the rendering process described above and illustrated in FIG. 7(a), there are two points at which each component is requested to perform rendering functions. The first request is that it does some preparatory work to prepare for painting (this occurs during step 702). The second request is that it should paint itself onto a memory buffer used for building the display output (step 714).

There are two reasons that the paint action is split into two steps. Firstly, if the display needs to be repainted again and the component hasn't moved or changed appearance, the first step is skipped for the repaint. The work done in the first step stays valid until the component next moves or changes appearance. Secondly, the output from the first step (step 702) is required by the rendering process before reaching the point where components can be painted (step 714). These two steps are described in more detail below.

In the first step, the component can do any preparatory work that may be useful to it internally, but it must at the very least provide details of its own bounding volume. The bounding volume is illustrated in FIG. 7(b). The rendering process needs to know the 2D bounding box (in pixel display coordinates) of each element in order to work out an efficient schedule for painting the display, and also, on pointer-based (e.g. mouse or stylus) devices, for efficient hit testing (see section 1.8.3). The 2D bounding box is the minimum sized rectangle on the display that is guaranteed to completely enclose the rendered object. However, the 3D object is specified in local 3D coordinates, not screen coordinates (see section 1.8.1), and its bounding volume is 3D and expressed in these same coordinates. No part of the 3D component can extend outside this bounding volume in local space, so the 2D bounding box is derived from the bounding volume, as it is the smallest rectangle that could completely contain the bounding volume once projected. Depending on the placement of the component, it may be scaled, rotated, or positioned in such a way that results in varying degrees of perspective, and thus the bounding volume must be equivalently scaled, rotated and projected to derive the correct bounding box. In the first step, therefore, the component must provide a set of points in its local coordinate system that describe the corners of the bounding volume. There are usually 8 corners for a non-planar element such as a 3D mesh, or 4 for a planar element such as an image or text fragment. The rendering process then fully maps each point in turn from local 3D coordinates to 2D display coordinates, and takes the bounding box to be the minimum rectangle that encloses all of these 2D points.

The mapping from local space to display space may involve a summation of two or more other mappings. At the root level of the GUI there is a "global" 3D coordinate space, and components positioned directly in the 3D space (rather than within other aggregate components), are positioned relative to this global space. The mapping from this space to 2D display coordinates is derived from various global configuration parameters, and accounts for projection (perspective) and scaling. Also, each aggregate component defines a local coordinate space within which its child components are positioned and oriented, and so on, to an arbitrary level of nesting. To correctly position an element on screen, therefore, the coordinates of its vertices must be mapped into the parent coordinate space, and its parent's parent's space, and so on, until it is expressed in global 3D coordinates, from where it can be mapped to 2D display coordinates. In practice, this is achieved with matrix mathematics, in ways that are familiar from 3D graphics programming.

Each mapping is expressed as a matrix, and sequences of mappings can be combined into single matrices for efficient mapping. Each component stores (caches) a matrix to map from its local space to global space, and these cached matrices are re-calculated only when necessary due to the movement or re-orientation of the component or one of its parents.

In the second request to the component, it is asked to paint itself to the display buffer. This can happen in one of two ways. Firstly, if the embodiment of the invention has available to it a 3D graphics library such as OpenGL, this will provide functions which can be used to draw the component by passing in 3D coordinates. In this case, the mapping matrices calculated and cached during the previous step must be passed into the graphics library to configure it. Typically, for OpenGL, the mapping from global coordinates to display coordinates is passed as the "projection" matrix, and the summation of the local coordinate mappings is passed as the "model-view" matrix. The result is that the OpenGL functions can be used to draw the component by passing in local 3D coordinates, and the library will do all the mappings from local 3D coordinates to 2D display coordinates internally.

If the embodiment has available to it only a 2D graphics library, or in the case that a certain type of element must be rendered using 2D screen coordinates even if a 3D graphics library is used for other elements, then the mappings must be made explicitly because there will be no provision for this in the library. One example of this is where an external component such as a text entry box needs to be imported and shown in the GUI. Assume that the text entry box can only be drawn in 2D, using display coordinates. It can still be positioned within the 3D GUI using 3D coordinates, at any level of nesting, in a consistent manner with other components (provided of course that no rotation is applied to it). Fortunately, these required mappings will usually have already been done, in building the bounding box. As part of the first rendering step, the bounding volume, which will be a flat rectangle, will be mapped to screen coordinates to give a bounding box, and in the second step these same 2D coordinates can be used for positioning and sizing the 2D component so that it appears at the correct location and scale within the rendered 3D interface. This technique has been used by the inventors with an entirely 2D graphics library to achieve quite effective 3D impressions using only a 3D spatial layout of 2D images with perspective and depth cueing.

1.11 Example of the Use of Embodiments of the Invention

As described, current GUI technologies impose a number of constraints on GUI design that arise from the fact that the layout of components is constrained to the two dimensional surface of the screen.

According to embodiments of the invention, a device's display can be treated as a viewport onto a 3D space, in which GUI components can be placed at any position, at any orientation, and at any scale. The net result is to offer a far greater degree of freedom in terms of GUI design, both from a visual and an interactive perspective.

There are discussed below some examples of how embodiments of the invention might exploit this increased flexibility to deliver more sophisticated GUI's on a device.

1.11.1 3D "Scrolling List"

One way the invention's novel capabilities might be exploited is via the creation of new GUI components that are far more engaging than (though functionally equivalent to) existing 2D components.

Figure 8:
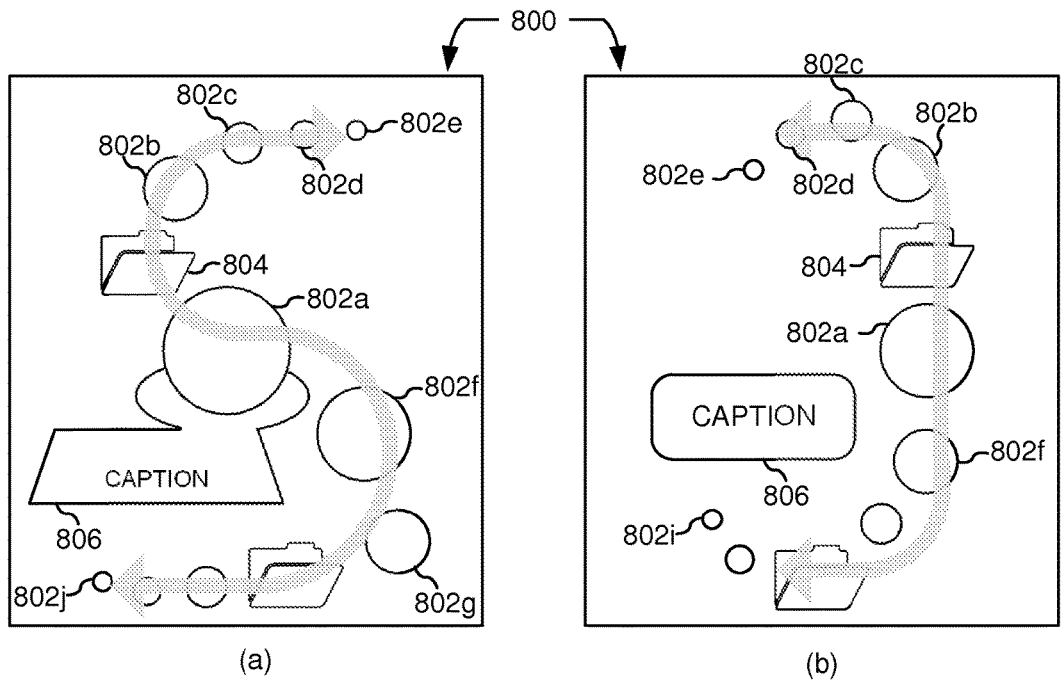
FIG. 8 shows two examples of how the invention enables the creation of 3D GUI components (in this case a scrolling "list") that are substantially different from their 2D counterparts.

FIG. 8 shows two examples of how embodiments of the invention enable the creation of a 3D GUI component (a scrolling "list") that is substantially different from its 2D counterpart (in this case a 2D "list box"). The present invention optionally allows both the richer visual representation of individual items in the list (e.g. via 'real' 3D objects instead of flat bitmap icons), but it also enables the items to be laid out and scrolled along any arbitrary path through 3D space, rather than shown in a static vertical arrangement. In FIGS. 8(a) and 8(b), on the screen 800, each of the displayed circles 802a-j may represent a document or file, such a jpeg, mpeg, text or other document, stored in a folder 804 in a directory on the device. The largest graphical component (circle 802a), which is treated as the current or selected component, is displayed in associated with a respective caption 806, which may contain the file name, author, date of creation, modification, file size, etc., as known in the art. Through touch screen, button, key entry mouse click or otherwise, the user can cause the device to scroll through the 3D rendered representation of files. In FIG. 8(a) this scrolling is displayed as movement over a 3D "S" shape, while in FIG. 8(b) the movement is similar to a rotation wheel. In each case, the aforementioned transformation-based 3D rendering is used to depict the movement.

1.11.2 Sophisticated Transition Effects

Figure 9:
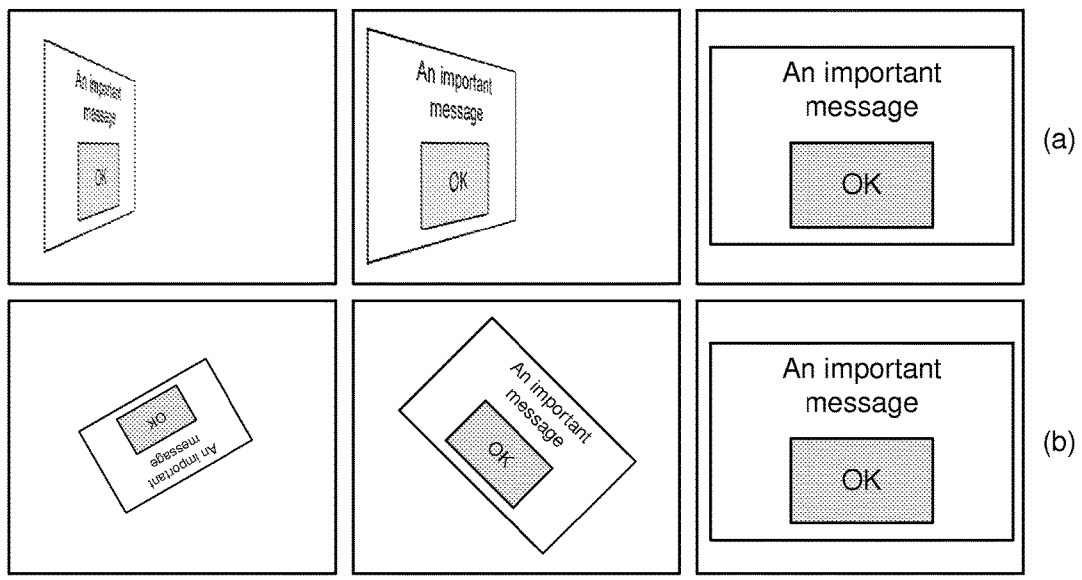
FIG. 9 shows how the invention enables sophisticated 3D transition effects, for each of two possible ways to display a message box; (a) pivoting on screen, and (b) spinning in from a distance)

FIG. 9 shows how the invention enables sophisticated 3D transition effects, for each of 2 possible ways to display a message box; (a) pivoting on screen, and (b) spinning in from a distance).

Embodiments of present invention enable any GUI components that are functionally related—regardless of their relative positions in 3D space—to be grouped together and manipulated (e.g. faded, spun, zoomed) as a coherent whole (an aggregate). As an example of how this might be applied in practice, consider a "message box", comprising some kind of panel, a caption, and an "OK" button, and often used in the context of GUI design as a way to alert the user to a particular occurrence.

2D GUI technologies generally offer ways to display a message box, but there is usually no way to control how it appears on (and disappears from) the display. In contrast, embodiments of the present invention enables advanced transition effects, achieved by altering the message box's placement over a short period of time. Thus it might be faded on to the display, spun towards the user from the distance, or pivoted on to the display from one side like a hinged door (see FIG. 9).

1.11.3 The Use of 3D Placement to Convey Useful Information

The relative placements of graphical elements may be used to provide meaningful visual feedback to users in ways that are not easily possible with 2D GUI technologies.

For example, an instant messaging client may display icons representing each of a user's contacts. Selecting an icon (e.g. via a stylus tap) might result in that person being sent a request to talk. Icons representing people who are actively engaged in conversation with the user might drift towards the screen, with others fading away. Icons representing two contacts in active dialogue with each other might slide across the display to become adjacent, with others sliding away to accommodate them.

The overall effect would serve to offer the user an overall view of their contacts, the spatial layout of which would itself immediately convey meaningful information that might be difficult to achieve within the constraints of 2D GUI technologies.

The above examples serve to illustrate some of the ways in which the invention enables the production of 3D GUI's that offer far more sophisticated user experiences, with little or no additional programming effort over that ordinarily required.

1.12 Implementing Embodiments of the Invention

As detailed above, the present invention enables electronic devices to be modified such that their displays show a graphical user interface which gives the visual impression of being constructed of a mixture of 2D and 3D graphical elements, which appear to be laid out, structured, animated, and interacted with, in three dimensions. The invention enables arranging the user interface in three dimensions, although the invention may be used to create a wide range of different GUI's.

An embodiment of this invention typically comprises a software system, installed and executed on the device, which necessarily includes the following functions:

It allows the GUI to be constructed and configured, and bound to other application functionality not concerned with user interface, such as data processing or communication functions;

It renders the 3D GUI on the device display, applying well-known techniques such as projection and depth cueing to achieve the effect of 3D on the 2D display;

It provides the framework and services required to make automatic updates to the user interface, for example to animate graphical elements by repeatedly updating the display, or to highlight elements which may receive input focus;

It deals with user input related to the user interface, such as detecting stylus taps on individual GUI elements and notifying the application software that the event has occurred.

The remainder of this section describes a specific exemplary embodiment of the invention, to illustrate how the invention may typically be realised by deployment of software. The invention may be usefully applied to any type of device with a display comprising a grid of many pixels. These devices may have different sizes and resolutions of display, different user input mechanisms, and different purposes. Examples could be TV set-top boxes, PDAs, in-car systems, and so on.

1.12.1 Scope of the Example Embodiment

The example embodiment is designed to run on a mobile telephone, operated by one hand using a 4-way joystick, numeric keypad and some additional function keys. The device display is a typical size and resolution for a mobile phone as of 2005.

On a mobile phone, software may be deployed in a number of ways. Software may be pre-installed on the device at the time of manufacture. This may be application software, which is run on demand by the user, or it may be system software, which is always running. Examples of application software would be a contact management application, or a game. Examples of system software would be the telephone dialing functionality, or the menu system used to choose functions on the device. The distinction between system and application software is not always clear when the software is pre-installed, but often the application software uses only part of the device display for its GUI, with the system software reserving another part of the display for status information such as battery and signal strength meters.

Alternatively, application software may be downloaded "over the air" by the phone user and installed for use. Some phones, often called smart phones, allow users to install software by transferring it from a PC via a cable or wireless connection.

All of these types of software may benefit from the invention. System software may use a 3D GUI for all functions of the device, with the user navigating 3D menus, and being notified of incoming calls by 3D animations. Alternatively, system or application software, however installed, may use the invention by presenting the user with a 3D user interface while using only certain applications or functions, even if the usual phone interface is 2D. The 3D user interface may occupy all or only part of the screen—for example, an application could show a 3D user interface, with the system software showing a 2D status area above it.

All of these permutations are valid applications of the invention, including those that combine the 3D user interface that uses techniques according to the invention with other elements of 2D user interface. In the example embodiment, the 3D user interface may be applied to any rectangular region of any application or system software, and thus may be combined with standard 2D user interface elements provided by the device platform.

1.12.2 Software Employed in the Exemplary Embodiment

Typically, the software embodying techniques according to the invention are delivered as software in the form of a library of binary code. The library would be used by applications or system software on the device in the usual way, by "linking" to it. The library may be pre-installed on the device (a requirement if used by system software) or installed along with applications that use it. Often if the library is used by more than one application, or pre-installed on the device, the software that uses it links to it "dynamically" when run. However, an embodiment could also be "statically linked", whereby the code that embodies the invention is linked directly into the software that uses it at the time the software is built. All of these methods are typical methods of delivering software of this type.

If software embodying the invention is supplied to the end user of the device, the libraries and the applications or other software that use them should be all that is required to be delivered. However, because the invention pertains to the design and construction of 3D user interfaces, including the programming of software that employs such an interface, it may sometimes be necessary to provide 3rd party software developers with a tool embodying techniques according to the invention that enables them to use it in their own software creations. Typically this is done by providing them with libraries plus additional "header files" which enable them to write software that links to those libraries and makes use of the 3D user interfaces that the libraries enable. In this case, the invention may be embodied both in the technology which enables it, namely the libraries and header files, and the resulting software constructed with that technology.

In the case of the exemplary embodiment, the software is suitably written in C++ and compiled for the Series 60 smart phone platform. The embodiment therefore comprises C++ header files, C++ source files (which are not usually distributed for reasons of protecting intellectual property), and compiled binary libraries for both Series 60 smart phones and Series 60 emulator software used by 3rd party developers. This package, along with documentation and other supporting material, would be sufficient for 3rd party developers to deploy the 3D GUI invention in their software for Series 60 smart phones. The Series 60 platform and the underlying Symbian OS provide low-level services required for construction of the embodiment, and also provides OpenGL software for performing low-level 3D functions such as rendering polygons, texture-mapping, and projection. To deploy the invention on different platforms or devices, different software packages may need to be prepared.

1.12.3 Further Comments on Implementing Embodiments of the Invention

The techniques required to realise the invention in software comprise a mixture of techniques from 3D graphics, 3D software development and GUI application framework design, plus some novel enhancements.

The exemplary embodiment uses OpenGL software to render 3D objects from the user interface into two dimensions for display on the device. Objects within the user interface are sorted according to their "depth" in the scene, and drawn from back to front, so that items at the front are drawn over items at the back. An alternative approach would be to use a "depth buffer" to ensure that items in front always appear in front, therefore obviating the need to sort the objects, and this is a more common approach in 3D software systems. The back-to-front approach is used in the example embodiment because the particular structure of a 3D GUI lends itself to being broken into individual items and sorted, and the approach consumes less device memory than using a depth buffer. Conserving device memory is an important objective on the Series 60 devices targeted by the example embodiment.

Other optimisations may use the layout of GUI objects within the scene to minimise the number of objects drawn to only those which need to be drawn because they have moved or otherwise changed. This minimises the amount of computation (and therefore time) required to render each frame, resulting in smoother animations. Similar characteristics of the interface can be used on stylus-based devices to efficiently detect which object was tapped by the stylus, something which is much more computationally intensive in general 3D applications such as games where the structure of the scene is not as constrained as in a GUI.

These are all examples of how the specific characteristics of the 3D user interface described, as compared to a general 3D scene, can be exploited to optimise the software to a particular device, platform or purpose, or indeed to provide general optimisations that would not be suitable for rendering a general 3D scene. Other embodiments may use different approaches to rendering 3D user interfaces due to different device parameters or constraints—for example, an embodiment that targets a less resource-constrained device may use depth buffering rather than drawing objects back-to-front, to achieve better graphics effects in certain situations at the expense of requiring more memory to operate.

On other platforms, OpenGL or similar 3D graphics libraries may not be available. In this case, the invention can still be realised, albeit maybe with limitations in effect. A feature of certain embodiments of the invention is the structure and layout of the user interface, and this can be realised in part without any underlying 3D graphics libraries at all. The coordinates of the 3D space may be mapped to display coordinates by the software, and 2D graphics APIs may be used with these mapped coordinates to render images, text, or even polygons of colour to build up 3D models. The coordinate mapping still allows projection and depth cueing to be achieved. Again, the specific characteristics of the 3D user interface can be exploited and this makes implementation on a 2D platform much more practical than it would be for a general 3D application. Limitations that may typically result include the inability to rotate certain objects such as images or text out of a plane parallel to the display.

The invention claimed is:

1. A method of processing image data, the method being carried out in an electronic device, the device having processing circuitry, memory and a display device, the method comprising:
    performing a transformation operation on a first image data of at least one two-dimensional graphical component to generate second image data, the second image data defining, for the at least one graphical component, a modified form of the graphical component;

performing a second operation comprising: determining whether a first graphical component that is in modified form intersects with a concurrently displayed second graphical component that is in modified form; and, if they are intersecting, determining whether to merge the first and second intersecting graphical components, based on a sum of areas of the first and second intersecting graphical components; and subsequent to the second operation and based on a determination that at least one of the first and second graphical components comprises a dirty region, displaying, using said second image data, the modified form of the first graphical component, wherein the at least one graphical component has the appearance of having a component of dimension perpendicular the plane of the display device.

2. The method according to claim 1, wherein determining whether to merge the first and second intersecting graphical components comprises:

determining whether merging the concurrently displayed first and second intersecting graphical components would be more efficient than leaving them as concurrently displayed, intersecting graphical components.

3. The method according to claim 2, further comprising:

if merging the concurrently displayed first and second intersecting graphical components would be more efficient than leaving them as concurrently displayed, merging the first and second intersecting graphical components to form a merged region that comprises a geometrical union of the first and second intersecting graphical components.

4. The method of claim 1, wherein the transformation operation further includes:

initializing a region list from bounding boxes of all elements shown in a preceding video frame;

adding a region to the region list for the bounding box of each element contained in the new frame;

sorting the bounding boxes into order of distance from the plane of the display (z-order); and discarding regions that are hidden behind others or are outside the periphery of the display.

5. The method of claim 1, wherein determining whether to merge the first and second graphical components further comprises:

determining if one of the first or second graphical components comprises a dirty region and the other comprises a non-dirty region; and if one of the first and second graphical components comprises a dirty region and the other comprises a non-dirty region, marking the non-dirty region as dirty.

6. The method of claim 1, wherein determining whether to merge the first and second graphical components further comprises:

determining whether the merged region would intersect a non-dirty region prior to merging the first and second graphical components; and if the merged region would intersect a non-dirty region prior to merging the first and second graphical components, then not merging the first and second graphical components.

7. The method of claim 1, wherein performing the transformation operation further comprises:

painting a 2D background into each dirty region; and
painting all dirty regions in Z-order.

8. The method of claim 2, wherein determining whether merging the first and second graphical components would be more efficient than not merging them comprises:

determining if a resulting merged region would have an area that is less than the product of a threshold factor multiplied by the sum of the areas of the first and second graphical components.

9. The method of claim 1, wherein the at least one graphical component comprises a dirty region when the component's constituent graphical elements change during the transformation operation and need to be repainted.

10. A non-transitory computer-readable medium having instructions thereon for executing a method of processing image data, the method comprising:

performing a transformation operation on a first image data of at least one two-dimensional graphical component to generate second image data, the second image data defining, for the at least one graphical component, a modified form of the graphical component;

performing a second operation comprising: determining whether a first graphical component that is in modified form intersects with a concurrently displayed second graphical component that is in modified form; and, if they are intersecting, determining whether to merge the first and second intersecting graphical components, based on a sum of areas of the first and second intersecting graphical components; and subsequent to the second operation and based on a determination that at least one of the first and second graphical components comprises a dirty region, displaying the modified form of the first graphical component, whereby the first graphical component has the appearance of having a component of dimension perpendicular the plane of the display device.

11. The non-transitory computer-readable medium according to claim 10, wherein determining whether to merge the first and second intersecting graphical components comprises:

determining whether merging the concurrently displayed first and second intersecting graphical components would be more efficient than leaving them as concurrently displayed, intersecting graphical components.

12. The non-transitory computer-readable medium according to claim 11, wherein the method further comprises:

if merging the concurrently displayed first and second intersecting graphical components would be more efficient than leaving them as concurrently displayed, merging the first and second intersecting graphical components to form a merged region that comprises a geometrical union of the first and second intersecting graphical components.

13. The non-transitory computer-readable medium of claim 10, wherein the transformation operation further comprises:

initializing a region list from bounding boxes of all elements shown in a preceding video frame;

adding a region to the region list for the bounding box of each element contained in the new frame;

sorting the bounding boxes into order of distance from the plane of the display (z-order); and discarding regions that are hidden behind others or are outside the periphery of the display.

14. The non-transitory computer-readable medium of claim 10, wherein determining whether to merge the first and second graphical components further comprises:

determining if one of the first or second graphical components comprises a dirty region and the other comprises a non-dirty region; and if one of the first and second graphical components comprises a dirty region and the other comprises a non-dirty region, marking the non-dirty region as dirty.

15. The non-transitory computer-readable medium of claim 10, wherein determining whether to merge the first and second graphical components further comprises:

determining whether the merged region would intersect a non-dirty region prior to merging the first and second graphical components; and if the merged region would intersect a non-dirty region prior to merging the first and second graphical components, then not merging the first and second graphical components.

16. The non-transitory computer-readable medium of claim 10, wherein performing the transformation operation further comprises:

painting a 2D background into each dirty region; and painting all dirty regions in Z-order.

17. The non-transitory computer-readable medium of claim 11, wherein determining whether merging the first and second graphical components would be more efficient than not merging them comprises:

determining if a resulting merged region would have an area that is less than the product of a threshold factor multiplied by the sum of the areas of the first and second graphical components.

18. The non-transitory computer-readable medium of claim 10, wherein the at least one graphical component comprises a dirty region when the component's constituent graphical elements change during the transformation operation and need to be repainted.

* * * * *